No. 698,173. Patented Apr. 22, 1902.
C. BORNMANN.
CAMERA.
(Application filed Apr. 9, 1901.)
(No Model.) 3 Sheets—Sheet 1.
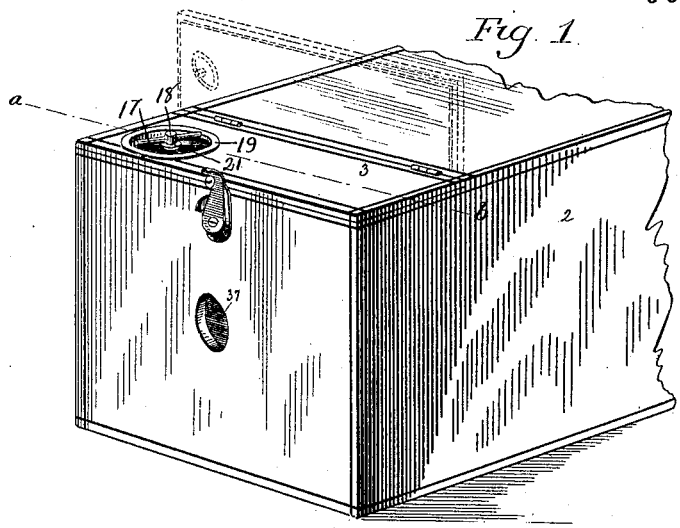
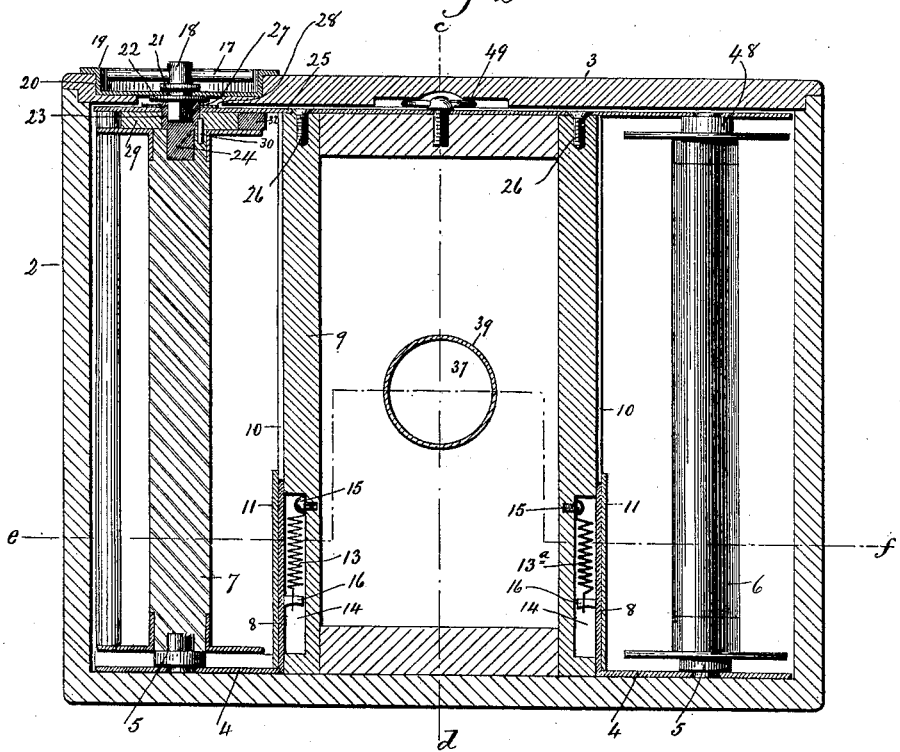

No. 698,173. Patented Apr. 22, 1902.
C. BORNMANN.
CAMERA.
(Application filed Apr. 9, 1901.)
(No Model.) 3 Sheets—Sheet 2.
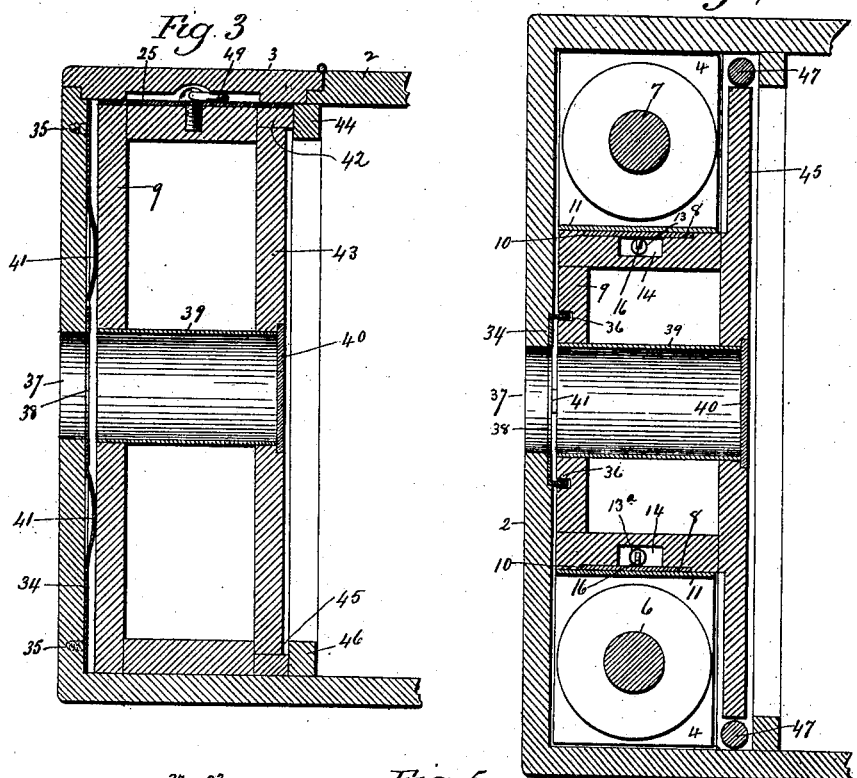
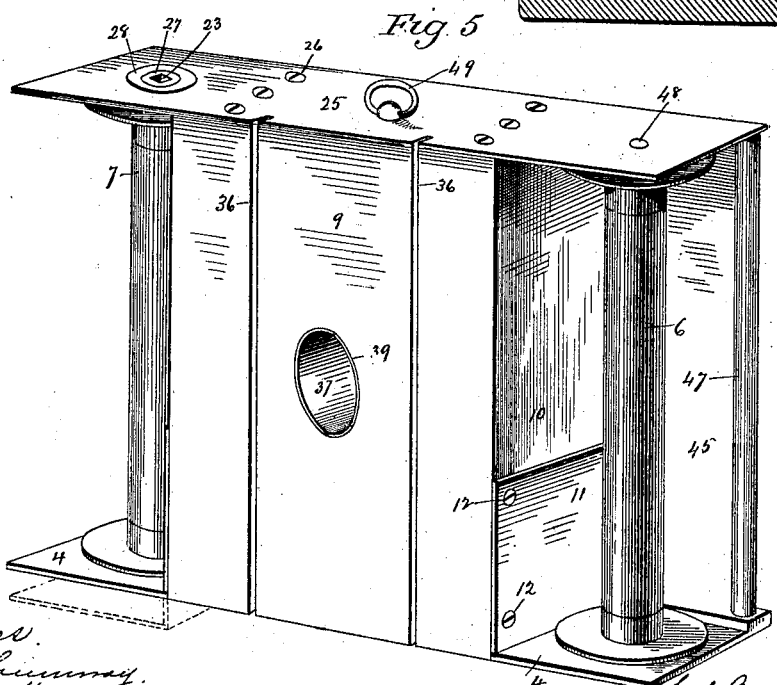

No. 698,173. Patented Apr. 22, 1902.
C. BORNMANN.
CAMERA.
(Application filed Apr. 9, 1901.)
(No Model.) 3 Sheets—Sheet 3.

Witnesses
J. H. Shumway
Lillian D. Kelsey

Carl Bornmann
Inventor
By attys. Seymour & Earle

UNITED STATES PATENT OFFICE.

CARL BORNMANN, OF NEW HAVEN, CONNECTICUT, ASSIGNOR TO E. & H. T. ANTHONY & CO., OF NEW YORK, N. Y., A CORPORATION OF NEW YORK.

CAMERA.

SPECIFICATION forming part of Letters Patent No. 698,173, dated April 22, 1902.

Application filed April 9, 1901. Serial No. 55,005. (No model.)

*To all whom it may concern:*

Be it known that I, CARL BORNMANN, of New Haven, in the county of New Haven and State of Connecticut, have invented a new Improvement in Cameras; and I do hereby declare the following, when taken in connection with the accompanying drawings, and the figures of reference marked thereon, to be a full, clear, and exact description of the same, and which said drawings constitute part of this specification, and represent, in—

Figure 6:
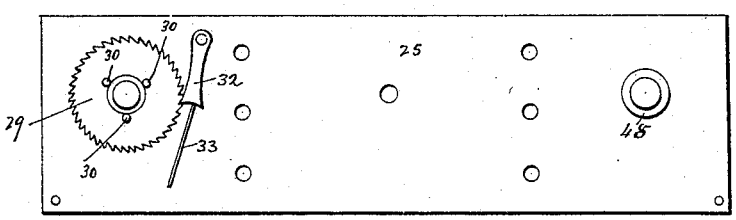
Figure 7:
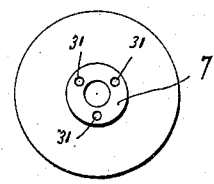
Figure 8:
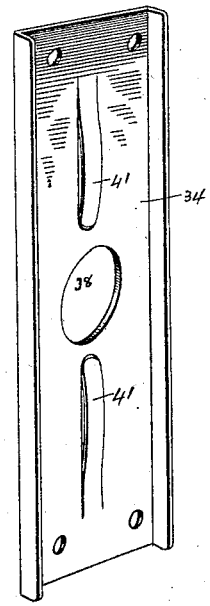
Figure 10:
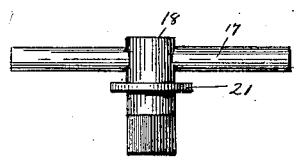
Figure 11:
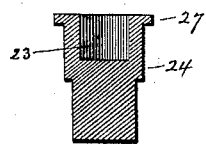
Figure 9:
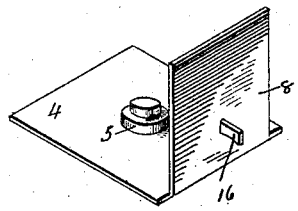

Figure 1, a broken perspective view of the rear end of a camera containing my improvements, the door being shown in its open position by broken lines; Fig. 2, an enlarged view of the camera in vertical section on the line $a\ b$ of Fig. 1, taken through the door and through the film-carrier; Fig. 3, a broken view of the camera in vertical section on the line $c\ d$ of Fig. 2; Fig. 4, a broken view of the camera in horizontal section on the irregular line $e\ f$ of Fig. 2; Fig. 5, a detached perspective view of the removable film-carrier; Fig. 6, a detached reverse plan view of the top plate of the film-carrier, showing the fixed journal at the right-hand end thereof for the upper end of the right-hand or supply spool and the pins provided for coupling the upper end of the left-hand or take-up spool to the rotary hub mounted in the left-hand end of the plate; Fig. 7, a detached view of one of the spools, showing its adaptation to be coupled with the rotating journal in the top plate of the film-carrier; Fig. 8, a detached perspective view of the combined guide and light-excluding trough; Fig. 9, a detached perspective view of one of the sliding journal-carrying plates; Fig. 10, a detached view, in side elevation, of the key; Fig 11, an enlarged detached sectional view of the rotating journal of the film-carrier.

My invention relates to an improvement in cameras, the object being to simplify their construction, to make them more convenient to us, and to increase the reliability of their performance.

With these ends in view my invention comprises a film-carrier having sliding journal-carrying plates, a key permanently mounted in the camera-box and adapted to be coupled with the take-up spool, and a combined guide and light-excluding trough for guiding the film-carrier and excluding light from the camera.

My invention further consists in certain details of construction and combinations of parts, as will be hereinafter described, and pointed out in the claims.

I will first consider my improved film-carrier, which is designed to be loaded with one full and one empty spool and to be introduced into and removed from the camera-box 2, which, as herein shown, is adapted for this purpose by its provision with a hinged door 3. I distinguish my improved film-carrier from "film-holders," so called, because after the unwinding of the film has been started my film-carrier cannot be removed from the camera, but must remain therein until the entire film has been exposed, whereas a "film-holder" as I understand the use of that term is constructed so that it may be put in and taken out of the camera at any time without considering whether the film has been exposed or not.

My improved film-carrier is provided with two sliding journal-carrying plates 4, furnished upon their upper faces with fixed journals 5, respectively adapted to be entered into the lower ends of the supply-spool 6 and the take-up spool 7, these spools being of ordinary construction, except as hereinafter specified. To adapt the plates 4 to be moved in line with the longitudinal axes of the spools, each of them is provided at its inner end with an arm 8, standing at a right angle to it and preferably formed integral with it. The said plates are located on the opposite sides of the body 9 of the carrier, the said body being located in the center thereof and being made, as shown, by framing together several pieces or plates of wood; but the specific construction of this body may be varied as desired. For the reception of the arms 8 of the sliding plates 4 the opposite sides of the body 9 are formed with shallow recesses 10, corresponding in depth and width to the thickness and width of the arms 8, which are confined in the said recesses by means of plates 11, secured in place by screws 12. The said plates are held in their normal positions by means of springs 13 and 13ª, located in spring-chambers 14, formed in the sides of the body 9 and leading out of the bottoms of the shallow recesses 10, before mentioned. Each spring is connected at one end to the body by means of a screw 15, while its opposite end is connected to a finger 16, formed upon the arm of its complementary plate. When the plates 4 are moved longitudinally, as shown by broken lines in Fig. 5, for the introduction or removal of the spools, the said springs are placed under tension and reassert themselves when outward pressure upon the plates is removed to restore the same to their normal positions, in which they not only support the spools, but also restrain the free rotation thereof and in this way take the place of other tension devices. As it is desirable that the supply-spool 6 shall rotate under more resistance than the take-up spool 7, the spring 13$^a$ is made the heavier of the two. The plates 4 are confined to sliding movement in lines parallel with the longitudinal axes of the spools, it being unnecessary to swing them in addition to sliding them, as has heretofore been done in roll-holders, for the reason that they form features of a film-carrier which is open at its ends rather than features of a roll-holder which is closed at its ends. It will be readily understood that the operation of these sliding journal-carrying plates requires no special dexterity and that they afford simple and easy means of introducing and removing the spools.

The permanently-attached key constituting another feature of my present invention is mounted, as herein shown, near one end of the hinged door 3 and comprises a bar 17, passed transversely through the outer end of a stem 18, journaled in a shallow sheet-metal cup 19, set into a recess 20, formed for it in the said door, the stem being held in place in the cup by means of a shoulder 21, formed upon it, and by means of a washer 22, applied to it, as shown in Fig. 2, whereby the stem is allowed to rotate freely in the cup, but held against longitudinal displacement. The inner end of the said stem is squared and adapted in size to be freely entered into a squared hole or socket 23, formed in the enlarged outer end of a rotary journal 24, mounted in the projecting left-hand end of the top plate 25 of the film-carrier, the said plate 25 being secured to the upper end of the body 9 of the film-carrier by means of screws 26. The said journal 24 is held against endwise displacement by the formation of its outer end with a flange 27, which engages with a washer 28, placed upon the outer face of the top plate 25, and by means of a ratchet-wheel 29, engaging with the inner face of the said top plate and secured, as shown, to the journal by means of three pins 30, which extend alongside of the journal and are provided for entering corresponding holes 31, formed in the top of the take-up spool 7, which is thereby coupled to the rotary journal and through the same to the key. The pawl 32, pivotally secured to the lower face of the top plate 25, is provided for engagement with the ratchet-wheel 29 and is operated by a spring 33, as shown in Fig. 6.

It will be understood from the foregoing description that the key is permanently mounted in the hinged door 3, that the rotary journal 24 is permanently mounted in the film-carrier, and that the squared end of the key-stem 18 is adapted in size to readily enter the squared socket 23 of the rotary journal when the door is closed after the film-carrier has been introduced into the box. The key and take-up spool are thus almost automatically coupled together and as readily disconnected. This construction avoids the loss of the key so frequent in many constructions and the necessity of any bothersome manipulations of the key for connecting it with the take-up spool of the camera.

For the purpose of guiding the film-carrier when introduced into and removed from the camera and for excluding light therefrom I employ a shallow sheet-metal trough 34, secured to the center of the rear end of the camera-box by screws 35, and form in the rear face of the framed body 9 of the film-carrier two long grooves 36 for the reception of the forwardly-extending flanges of the said trough. These flanges coact with the side walls of the said grooves to guide the carrier and also to cut off and exclude any light which might otherwise diffuse itself into the camera-box by entering the peep-hole 37, formed in the rear end thereof, and passing between the inner face of the rear end of the camer-box and the rear face of the body 9 of the film-carrier, as will be understood by reference to Fig. 4. Any light which may get into the box in this way is intercepted by the said flanges. A circular opening 38, formed in the trough midway the length thereof, registers with the peep-hole 37 and with the peep-tube 39, located in the body 9 of the film-carrier and closed at its forward end by a piece of red glass 40 or other equivalent material. Two springs 41, formed integral with the trough, press the film-carrier forward and maintain it in right position in the camera-box, as shown in Fig. 3, in which the film-guiding rib 42, formed at the upper edge of the film-support 43 of the film-carrier, is engaged with the cross-piece 44 of the camera-box, and in which the guide-strip 45, into which the lower end of the film-support is set, is engaged with the cross-piece 46 of the camera-box. The said film-support 43 consists of a rectangular plate of wood secured to the front of the body 9 of the film-carrier and is flanked at each end by long rod-like antifriction-rollers 47, journaled at their upper ends in the forward corners of the top plate 25 and at their lower ends in the projecting ends of the guide-strip 45, which is secured to the forward lower corner of the body 9 of the film-carrier. It will be understood, of course, that as the film is fed from the supply-spool 6 it passes over the adjacent antifriction-roll 47 and thence over the front face of the film-support, from which it passes over the other antifriction-roll 47 onto the take-up spool 7, upon which it is wound. The film-guiding shoulder 42 and the projecting forward edge of the guide-strip 45, respectively, prevent the upward or downward displacement of the film. The right-hand end of the top plate 25 is provided with a fixed journal 48, which is entered into the upper end of the supply-spool 6. The handle 49, applied to the center of the top plate, enables it to be conveniently handled in being introduced into and removed from the camera-box.

I would have it understood that I do not limit myself to the exact details of construction herein shown and described, but hold myself at liberty to make such changes and alterations as fairly fall within the spirit and scope of my invention.

Having fully described my invention, what I claim as new, and desire to secure by Letters Patent, is—

1. In a film-carrier, the combination with a centrally-arranged body, of a film-support applied to the front of the said body, a top plate secured to the top of the said body and projecting at its ends beyond the same, journals mounted in the projecting ends of the said plate for coaction with the upper ends of the spools, sliding journal-carrying plates corresponding to the projecting ends of the top plate and having sliding connection through their inner ends with the lower portion of the said body, and springs connecting the said sliding plates with the body for maintaining the plates in their normal or spool-supporting positions.

2. In a film-carrier, the combination with a centrally-arranged hollow body, of a film-support applied to the front thereof, a top plate secured to the top of said body and projecting at its ends beyond the same, journals mounted in the projecting ends of the said top plate for coacting with the upper ends of the spools, and two sliding journal-carrying plates corresponding to the projecting ends of the top plate and having yielding sliding connection with the lower end of the body.

3. In a film-carrier for cameras, the combination with a body, of journals for the upper ends of the spools, and two sliding journal-carrying plates having arms entering recesses in the body and guiding the sliding movement of the plates, and springs connected with the said arms for maintaining the plates in their normal spool-supporting positions.

4. In a film-carrier, the combination with a body formed with recesses and spring-chambers, of a top plate secured to the upper end of the said body and carrying journals for the upper ends of the spools, sliding journal-carrying plates formed with arms adapted to enter the said recesses, and springs located in the said spring-chambers and connected with the body and with the said arms, and maintaining the said plates in their normal spool-supporting positions.

5. In a film-carrier, the combination with a centrally-arranged framed body, of a film-support applied to the front thereof, a top plate secured to the top of the said body and projecting at its ends beyond the same and beyond the ends of the film-support, a guide-strip located at the lower edge of the film-support and projecting beyond the ends thereof, antifriction-rollers mounted in the forward corners of the top plate and in the ends of the said guide-strip and located adjacent to the ends of the film-support, journals mounted in the projecting ends of the said top plate for coaction with the upper ends of the spools, and journals connected with the lower portion of the said body for receiving the lower ends of the spools.

6. In a film-carrier, the combination with a box provided at its rear end with a hinged door, of a rotary key permanently mounted in the said door and having a stem projecting beyond the inner face thereof, and a film-carrier adapted to be introduced into the camera-box and removed therefrom through the said door and provided with a journal for the take-up spool, the said journal being formed with a socket which receives the said stem of the key when the door of the camera is closed, whereby the closing of the said door connects the key with the said spool and the opening of the said door disconnects the key from the said spool.

7. In a camera, the combination with a combined guiding and light-excluding trough secured to the inner face of the rear end of the camera-box, of a film-carrier, the body of which is formed with grooves for receiving the forwardly-projecting flanges of the said guiding and light-excluding trough, whereby the film-carrier is guided in being introduced into and removed from the box, and whereby light is excluded from the box.

In testimony whereof I have signed this specification in the presence of two subscribing witnesses.

CARL BORNMANN.

Witnesses:
  FREDERIC C. EARLE,
  GEORGE D. SEYMOUR.